United States Patent [19]

Galigani

[11] Patent Number: 4,871,305

[45] Date of Patent: Oct. 3, 1989

[54] MACHINE FOR VULCANIZING TIRES, WITH DEVICES FOR COLLECTING AND UNLOADING THE TIRE BEING TREATED

[75] Inventor: Tiziano Galigani, Pistoia, Italy

[73] Assignee: Cima Impianti S.p.A., Pistoia, Italy

[21] Appl. No.: 186,595

[22] Filed: Apr. 27, 1988

[30] Foreign Application Priority Data

Apr. 30, 1987 [IT] Italy .................................. 9381 A/87

[51] Int. Cl.⁴ ............................................ B29C 35/00
[52] U.S. Cl. ....................................... 425/35; 425/36; 425/38
[58] Field of Search ....................... 425/38, 39, 35, 36, 425/47–49, 51–54, 58

[56] References Cited

U.S. PATENT DOCUMENTS

| | | | |
|---|---|---|---|
| 3,520,024 | 7/1970 | Caretta et al. | 425/38 |
| 3,936,251 | 2/1976 | Billey | 425/38 |
| 4,068,989 | 1/1978 | Cantarutti | 425/38 |
| 4,124,345 | 11/1978 | Grunner et al. | 425/39 |
| 4,236,883 | 12/1980 | Turk | 425/38 |
| 4,289,463 | 9/1981 | Le Moullac | 425/38 |
| 4,365,945 | 12/1982 | Salvadori | 425/38 |
| 4,604,043 | 8/1986 | Pizzorno et al. | 425/38 |
| 4,647,273 | 3/1987 | Singh et al. | 425/38 |
| 4,800,059 | 1/1989 | Drewel et al. | 425/38 |

Primary Examiner—Willard Hoag

[57] ABSTRACT

In a tire vulcanizing machine—comprising an element for moving the tire and a mold with several segments carrying mold sections that can move radially—the top section of the mold is held by said element, which can move axially and angularly to occupy one position in which it can collect the untreated tire, one position in which it places the tire into the mold and one position in which it unloads the vulcanized tire onto devices which collect and remove it; element comprises devices which engage the upper rim of said tire on the top section of the mold in the collection position; devices for centering said rim with respect to the top section of the mold are also provided.

16 Claims, 10 Drawing Sheets

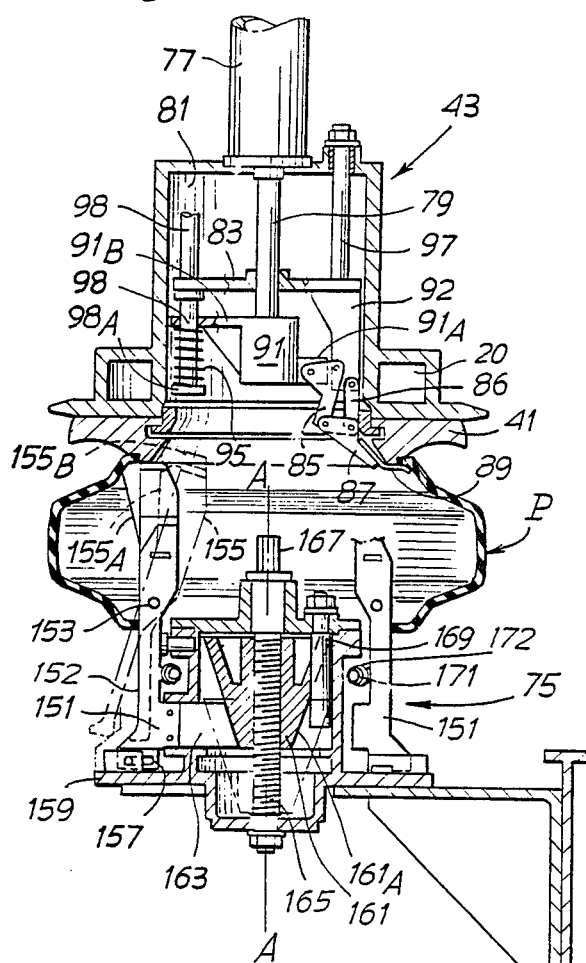
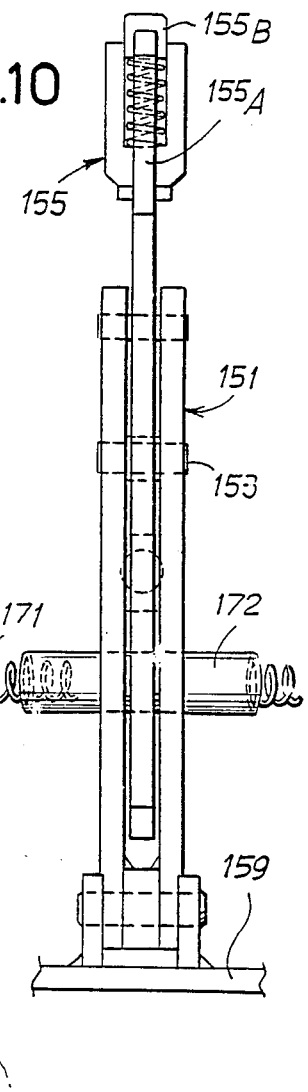
Fig.5
Fig.10

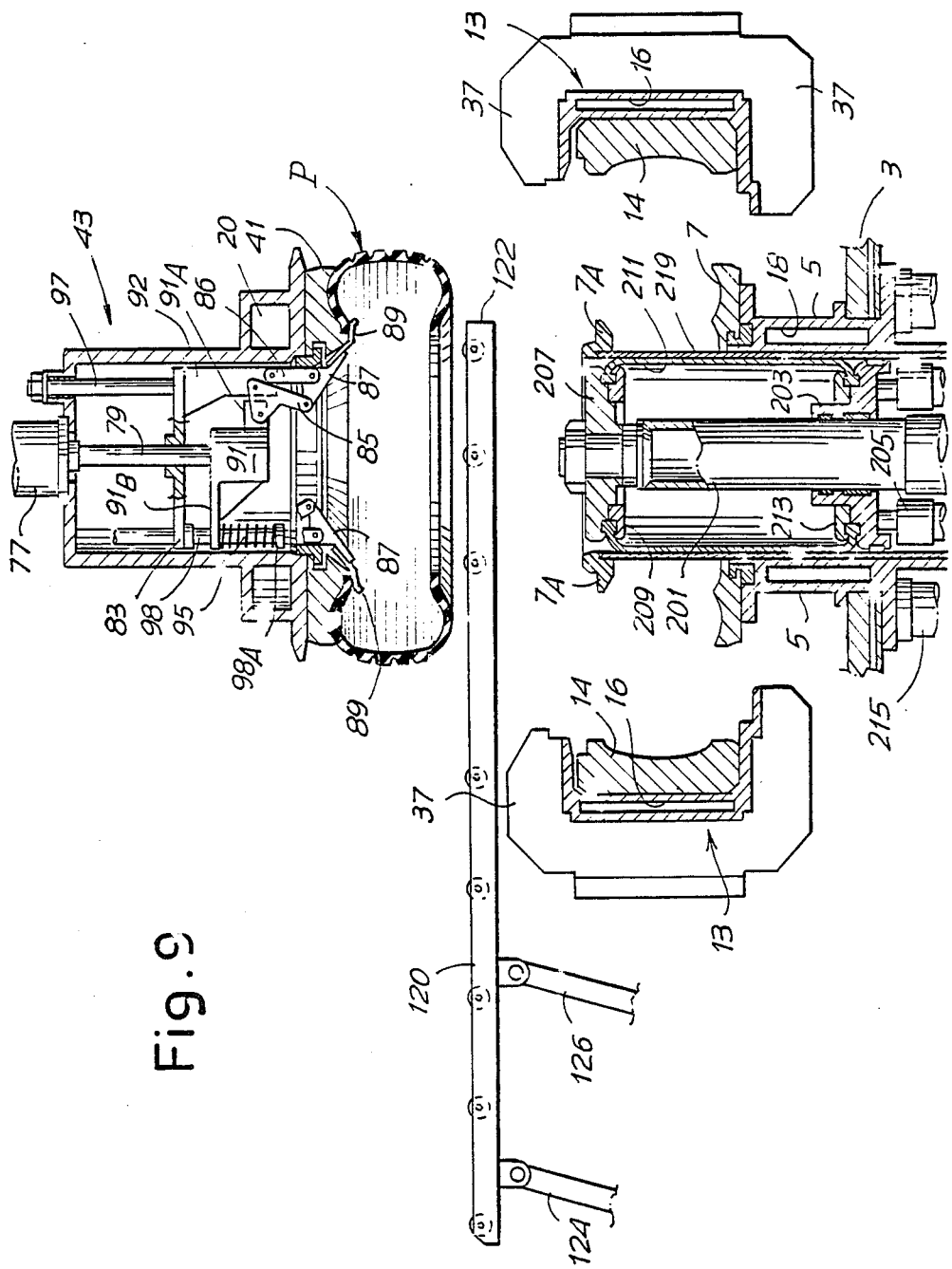

MACHINE FOR VULCANIZING TIRES, WITH DEVICES FOR COLLECTING AND UNLOADING THE TIRE BEING TREATED

FIELD OF THE INVENTION

The invention concerns a machine for vulcanizing tires, particularly vehicle tires, comprising an element for moving the tire being treated, which is approximately horizontal, and a mold which has several segments with mold sections that can be moved radially.

BACKGROUND OF THE INVENTION

In machines of this type that are already known, the closing section is normally moved angularly so that it has a closed and an opened position. In this type of machine the untreated tires are loaded manually or by means of external loading devices that are separate from the machine itself.

Manual loading obviously involves high plant management costs, and when devices that are separate from the machine are provided for loading the untreated tires, plant costs are high and a great deal of floor space is required. In any event, these known types of machines create functional problems. In fact the untreated tire that is loaded into the open mold is left free until the upper part of the mold is lowered to close it. This involves the risk of the untreated tire being misaligned inside the mold before it is closed. This chiefly arises because the untreated tire is particularly unstable and easily deformed. If the tire warps when it is resting on the bottom section of the mold and before the top section of the mold is closed, defects will occur during vulcanization and there will be rejects, with the resultant effects on production costs.

SUMMARY OF THE INVENTION

The subject of the invention is a machine of the type described above which does not have the above-mentioned disadvantages and which, in particular, allows greater economy of production and fewer rejects. Basically this machine comprises the following: the top section of the mold is held by an element; the element can move axially and angularly to occupy at least one position in which it can collect the untreated tire, one position in which it places the tire into the mold and one position in which it unloads the vulcanized tire onto devices which collect and remove it; the element comprises devices which engage the upper rim of said tire on the top section of the mold in the collection position; and devices which operate in the collection position are provided for centering the same upper rim of the tire with respect to the said top section of the mold. The moving element is therefore involved both in moving the tire and in opening and closing the mold for vulcanization. This speeds up the untreated tire loading, mold closure, vulcanization and subsequent vulcanized tire unloading operations.

In a practical version of the invention the element is supported by an arm actuated by a first piston/cylinder system as regards the axial movement and a second piston/cylinder system as regards the angular movement; guide devices are provided to guide the arm in the axial movements.

The guide devices may comprise a fixed guide and pairs of rollers which engage on the guide alternately.

The devices which hold the tire may for example comprise elements which are connected to a control system and have restricted movement with respect to each other, the relative movement of the elements causing the elements which grab the tire to operate. In one possible version of the invention the devices which hold the tire may comprise a combination of the following: a plate and an element that is integral with the rod of a piston/cylinder system; compression springs that can stress the element and the plate so that they are relatively close to each other, the plate being able to slide axially on the rod; hinged to the element and/or to pieces that are integral with the said plate is a set of oscillating elements which are themselves hinged to grabs, the grabs also centering and setting the tire on the top section of the mold; and guide rods which act as a support and cause the relative movement of the plate and the element.

In a practical example - in which the said machine also comprises a flexible chamber for pressurizing and heating the inside of the tire during vulcanization and devices which move axially with respect to the mold itself and support the flexible chamber, the devices and associated chamber moving into and out of the mold when the machine is working - the pressurized flexible chamber holds the tire in position while the mold is closing. In this way the tire is always kept centered in the mold and is never left unrestrained, so that it cannot deform prior to vulcanization. For this purpose it may be an advantage for the flexible chamber to be at least partially pressurized before the devices, which hold the upper rim of the said tire, open.

Coaxial to the devices which move axially are additional devices which move axially and which support a mold section; these additional devices which support a mold section can be controlled independently of the first devices which move axially.

In the tire collection position there may be a feed device on which the untreated tire is placed; this device has support and centering devices for the upper rim of the tire, and guide surfaces for guiding the tire itself.

In an advantageous practical version the said support and centering devices comprise elements which oscillate radially and are arranged symmetrically around the axis of the device, and may also comprise a flexible support section for the moving element.

The oscillating elements may be hinged to corresponding forks at an intermediate point, the oscillation of the oscillating elements being controlled by the lower rim of the tire which is placed onto or taken off the feed device. So that they can receive different sizes of tires, the position of the forks may be adjusted radially by means, for example, of a cone whose position can be adjusted axially, and flexible devices are provided to bring the support and centering devices back in a centripetal, radial direction.

A better understanding of the invention will be obtained from the description and the attached drawings which shows a practical but non-exhaustive example of the invention itself.

BRIEF DESCRIPTION OF THE DRAWINGS

FIGS. 2 and 2A are a plan view of the machine in FIG. 1 and a special enlargement of it;

FIGS. 5 to 9 show five successive operating stages of the machine according to the invention;

FIG. 10 shows a detail of the feed device according to the invention and

Figure 1:
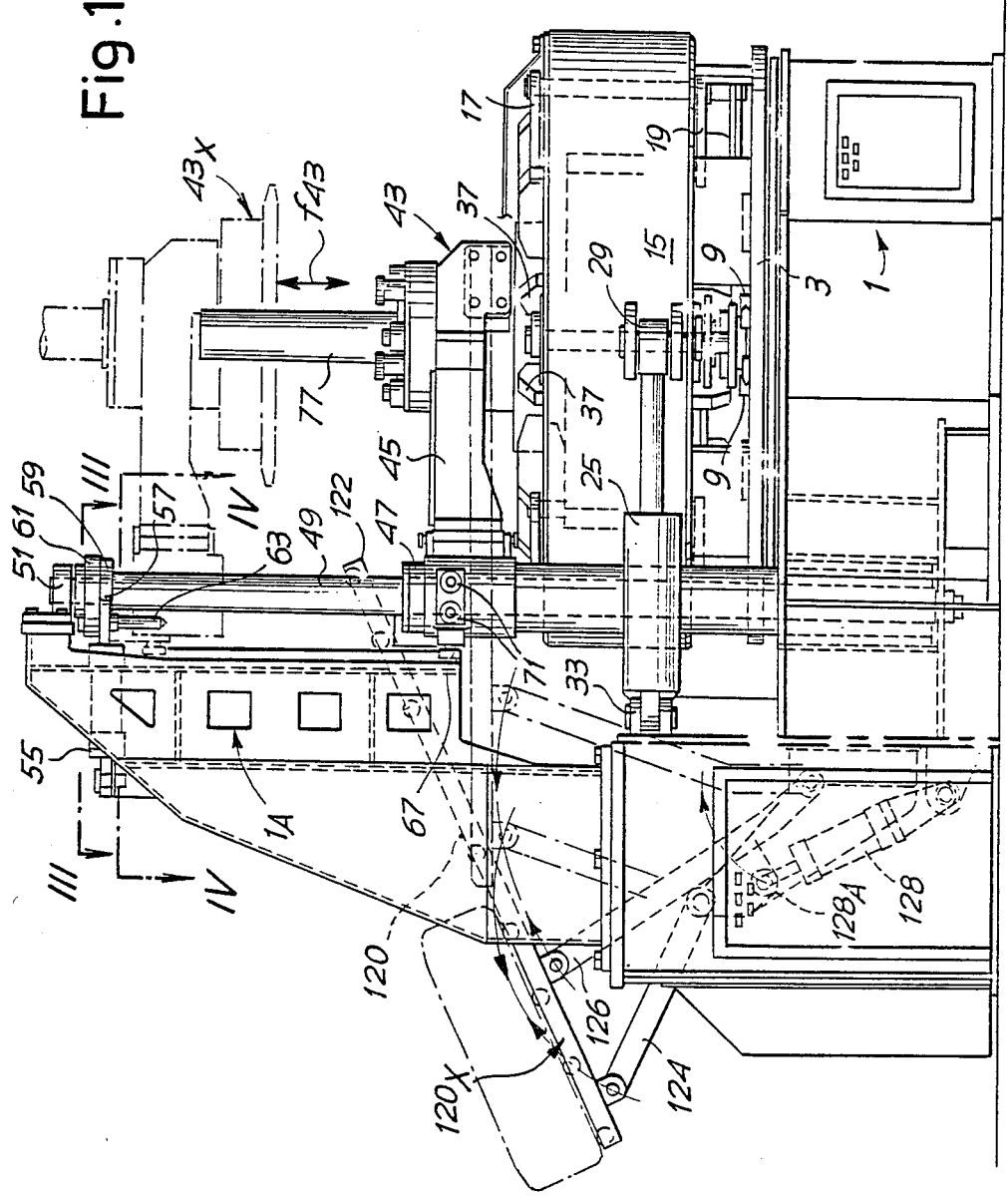
FIG. 1 is a side view of the machine according to the invention.

According to the illustrations in the attached drawing, a machine according to the invention has a base 1 with a plate 3 (FIGS. 1 and 8), on which is mounted a structure 5 bearing the bottom section 7 of the tire vulcanization mold. Plate 3 also has guides 9 for slides 11 which, by their radial closing and opening movement, guide segments 13 which bear radial sections 14 of the tire vulcanization mold.

In order that the radial movement of segments 13 can be controlled simultaneously, each segment 13 is connected to an external ring 15 by means of connecting rods 17, 19 and pins 21, 23 so that when ring 15 rotates in one direction or the other (according to f15), segments 13 open and close. Ring 15 is made to rotate by a dual piston/cylinder system 25, 27 secured to ring 15 at 29 and 31 and to base 1 at 33 and 35. The use of a dual piston/cylinder system allows the forces required to close segments 13 to be distributed more satisfactorily. Each segment 13 has a pair of radial spurs 37. When segments 13 are closed, the spurs 37 engage with projections 39 on ring 15; the stresses caused by the pressure inside the mold during vulcanization are transferred to projections 39 acting on spurs 37 in the closed position.

At the sides, segments 13 have elements 38 for centering adjacent spurs 37. The elements 38 may generally comprise male and female sections which mate with each other when segments 13 are closed.

The mold which is made up of sections 7 and 14 has a section 41 at the top which is fitted to an element 43 supported by an arm 45 which is integral with a cylinder 47 of a piston/cylinder system with a moving cylinder 47 and a fixed piston. Ends 51 and 53 of rod 49 are in fact secured to an upright 1A which is integral with base 1 and to base 1 itself respectively; cylinder 47 can move axially along the said rod to allow element 43 to move vertically according to f43.

Figure 2:
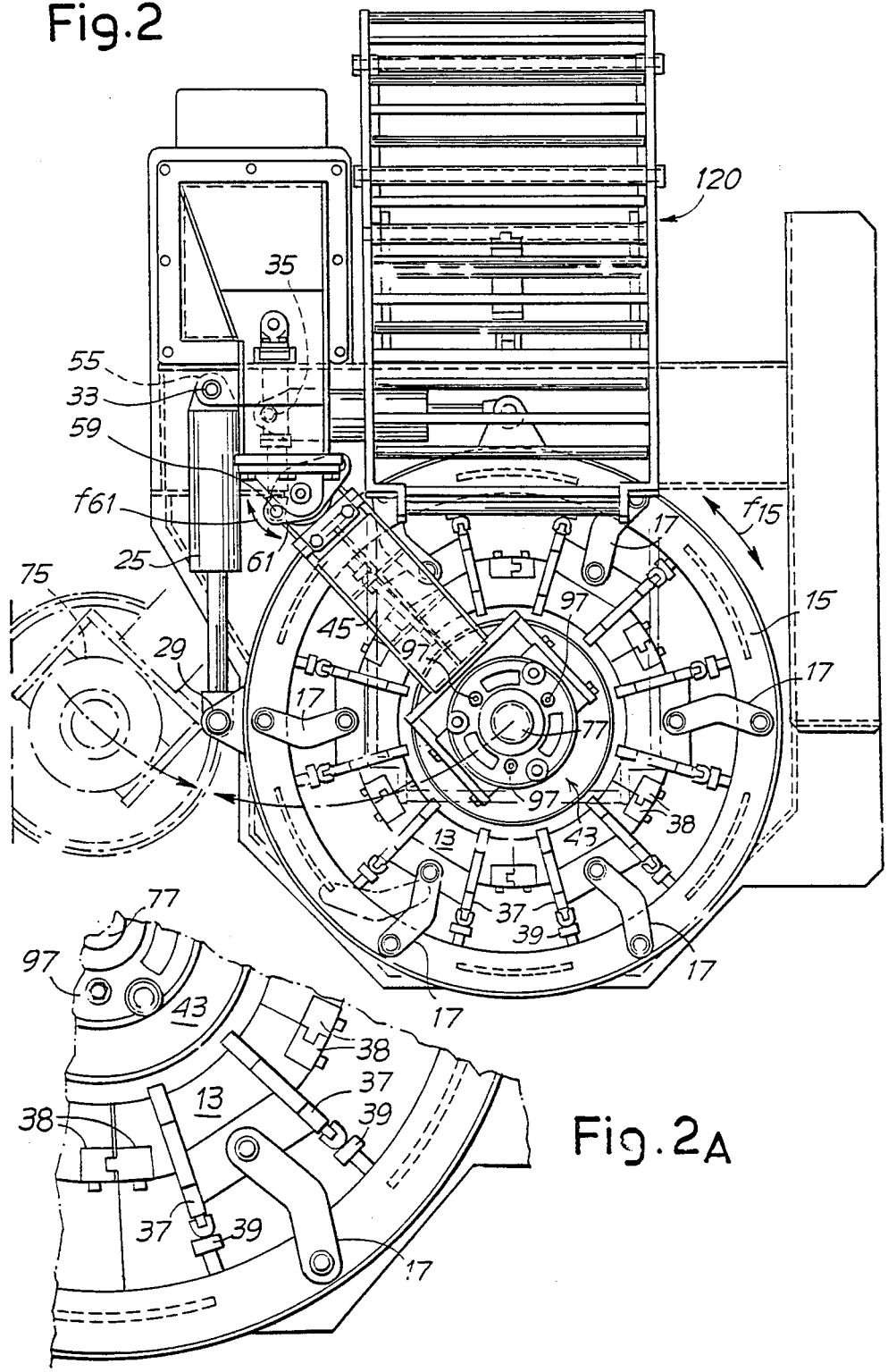
Figure 3:
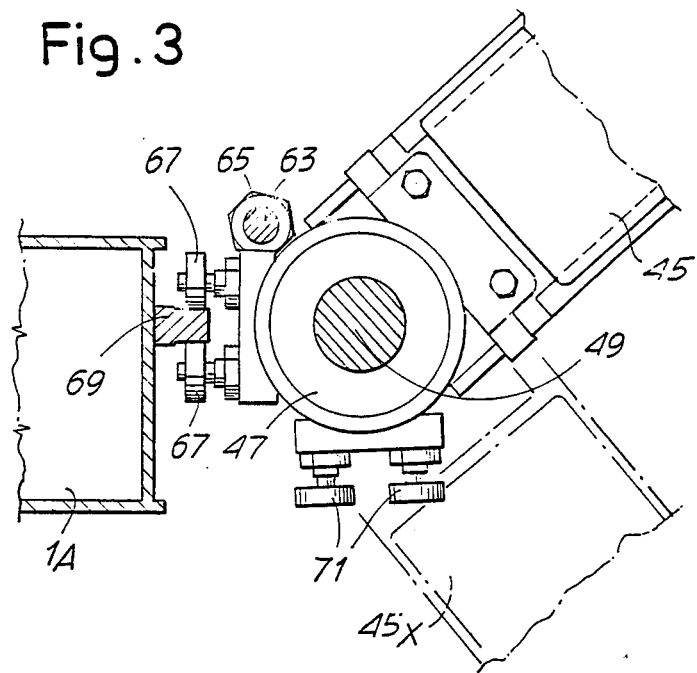
FIGS. 3 and 4 are sectional views through III—III and IV—IV in FIG. 1.
Figure 4:
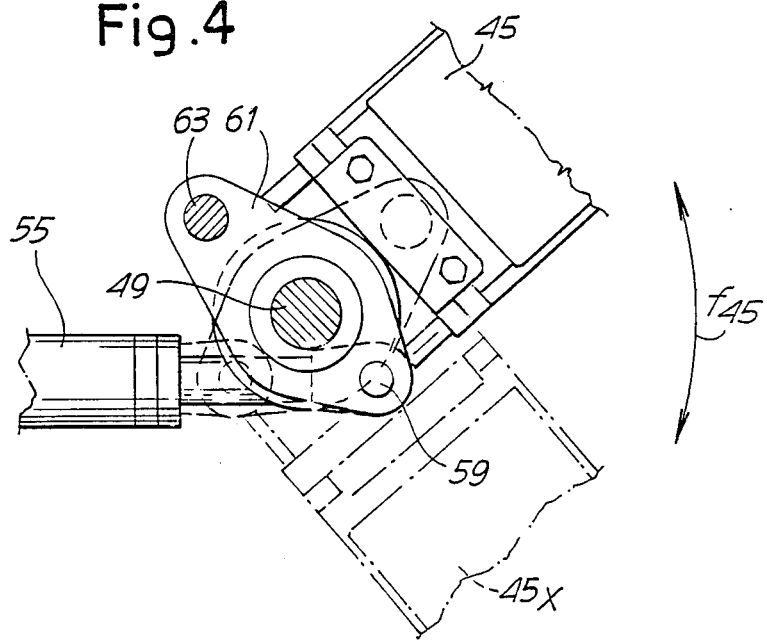

As shown in FIGS. 1 and 2 in particular, cylinder 47 and arm 45 which is integral with it may rotate around the axis of cylinder 47 itself as a result of the action of a piston/cylinder system 55. For this purpose, end 57 of the rod of the said piston/cylinder system 55 is secured at 59 to a plate 61 which may oscillate according to f61 as a result of the action of piston/cylinder system 55. Plate 61 has a pin 63 which can engage in a corresponding seat 65 which is integral with moving cylinder 47 when the said moving cylinder 47 is raised by the action of the fluid inside it. When element 43 occupies position 43X shown in broken lines in FIG. 1, therefore, pin 63 engages in corresponding seat 65 and hence the oscillation of plate 61 according to f61 causes cylinder 47 to rotate and arm 45 to oscillate around the axis of rod or central support 49 according to the double arrow f45 (FIG. 4). Arm 45 may occupy the two positions drawn in unbroken and broken lines (position 45X) in FIGS. 3 and 4 and rotated through a suitable angle for the purposes described below.

As it travels vertically from the closed mold position to the position in which pin 63 engages in seat 65, cylinder 47 is guided by two adjacent rollers 67 which roll on a guide 69 which is integral with upright 1A. The length of guide 69 is such that rollers 67 are completely disengaged from it when element 43 has reached its uppermost position 43X (FIG. 1), so that cylinder 47 is able to rotate about its own axis. Integral with cylinder 47 is a second pair of rollers 71 whose axes of rotation form an angle with respect to the axes of rotation of rollers 67 that is equal to that through which arm 45 rotates when moving from one of the positions shown in FIGS. 3 and 4 to the other. When arm 45 occupies position 45X, therefore, rollers 71 correspond with guide 69 and as cylinder 47 then descends, rollers 71 engage on guide 69 and thus guide cylinder 47 in its descent.

When arm 45 oscillates according to f45, element 43 can be positioned either in alignment with the axis of the mold - the subsequent descent thus allowing the mold itself to close so that the tire can be vulcanized - or with respect to a tire feed device generally shown as 75 in FIG. 2. In this second position, element 43 may be lowered so as to collect the tire that is to be vulcanized.

Inside element 43 is a device for collecting the tire from the feed device 75, placing it in the mold for vulcanizing and then collecting and unloading it after vulcanization, as described in greater detail below with reference to the various operating stages of the machine. The said device comprises a piston/cylinder system 77 whose rod 79 extends into a chamber 81 inside element 43. The end of said rod 79 has an element 91 with which a number of pieces 91A are integral although only one is visible in the illustrations on the attached drawing. The number of the said pieces may vary according to the size of the tire to be treated and may, for example, be six.

Hinged to each piece 91A is an oscillating element 85 which is also hinged to a piece 92 that is integral with a plate 83 fitted onto rod 79 and free to slide axially on it. Obviously the number of pieces 92 that are integral with plate 83 is equal to the number of pieces 91A that are integral with element 91 on rod 79. Also integral with plate 83 are rods 97, one of which can be seen in the attached illustrations, which project from chamber 81 so as to form guide and support elements for said plate 83. Also integral with plate 83 are pins 98 which come from the section opposite rods 97 and these are also provided in sufficient numbers. One of the rods can be seen in the attached illustrations. Each pin 98 has a shoulder 98A at the end and between shoulder 98A and piece 91B on element 91 is a compression spring 95 for the purposes described below.

A rocker arm 86, which is also hinged to a connecting rod 87 at the opposite end, is hinged to each piece 92 that is integral with plate 83. An arm or end section 89, which is a device for grabbing the tire P being treated, is integral with a piece on connecting rod 87.

Figure 8:
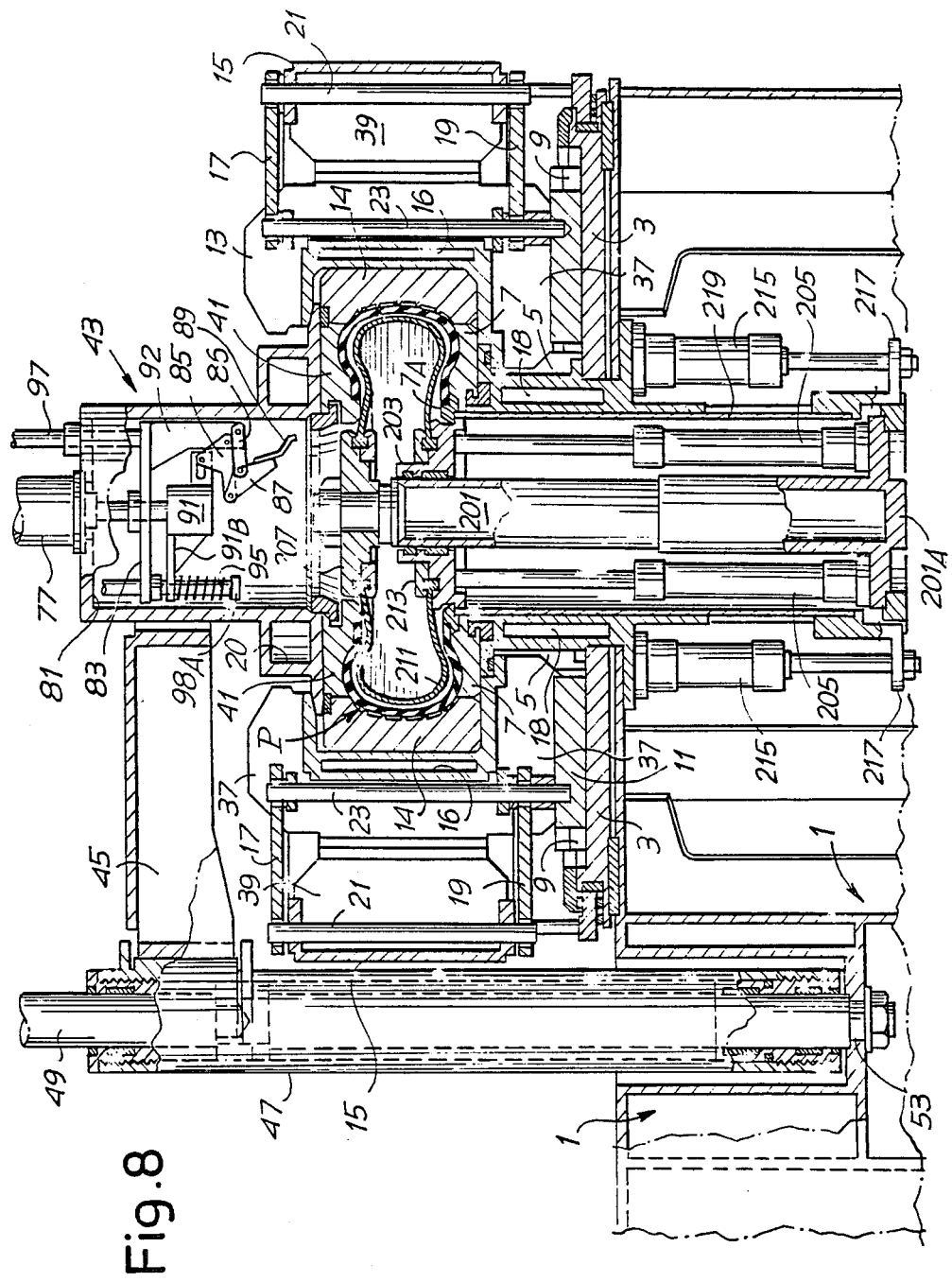

Compression springs 95 are used to keep plate 83 and element 91 close to each other, as shown in particular in FIG. 8. When a tire P needs to be taken from the feed device 75, element 43 is lowered onto it so as to bring sections 41 of the mold into contact with one of the two inside rims of tire P, as can be seen in particular in FIG. 5. During this initial descent stage plate 83 and element 91 on rod 79 are brought close to each other and the grabs 87, 89 are retracted.

After the initial part of the descent the supports formed by rods 97 lock plate 83 and prevent further descent so that when rod 79 continues to move, element 91 is drawn away from plate 83, springs 95 are compressed and oscillating element 85, rocker arm 86, and hence connecting rod 87 oscillate round their respective pivot points. This causes arms or end sections 89 on connecting rods 87 to come out and grip the upper rim of tire P. The grabs formed by end sections 89 remain apart until rod 79 is raised again by piston/cylinder system 77, as will be described below with reference to the illustrations that relate to the various stages of operation.

Feed device 75 is designed so as to accept tires of different diameters. It can also be used to support untreated tires P for long periods of time without them being warped, which would adversely affect the next stages of the operation and vulcanization in particular.

For this purpose, device 75 has a set of forks 151, which can be seen in FIG. 5 and particularly in FIG. 10, which are uniformly distributed round its axis A—A. The number of said forks may vary according to the dimensions of device 75, and may advantageously be equal to the number of connecting rods 87 and associated arms or end sections 89, but they are offset with respect to the arms themselves.

Each fork 151 has an oscillating lever 155 hinged at 153 and this occupies two positions which are shown in broken and unbroken lines in FIG. 5.

Oscillating levers 155 occupy the position shown in broken lines in FIG. 5 when there is no tire P on device 75. When an untreated tire P is placed onto device 75, the lower rim of tire P is guided by the edges 152 of each fork 151 and at the same time the same lower rim of tire P causes oscillating lever 155 to oscillate round pivot point 153 until it occupies the position shown in unbroken lines in FIG. 5. In this position a projection 155A on each oscillating lever 155 forms a support for the upper rim of tire P on device 75. In this way, when the untreated tire P is placed onto feed device 75, it is supported along its own upper rim by means of projections 155A so that it cannot buckle under its own weight; as it is untreated the tire can easily warp at this stage. Buckling caused by the weight of the tire could jeopardize subsequent treatment processes.

A top section 155B on each oscillating lever 155 is able to yield when element 43 descends over device 75, so that instead of mold section 41 bumping violently against oscillating levers 155, the sections 155B yield gradually until moving element 43 has completed its descent.

The positions of forks 151 are adjustable as they can slide radially and can occupy a position according to the internal dimensions of the tire they are to grip. For this purpose each fork 151 has a bottom guide slot 157 in which a guide pin, which is integral with base 159 of device 75, can slide. To adjust the radial position of forks 151 there is a cone 161 whose skirt 161A matches pawls 163 which are integral with each fork 151. As this cone is upside down, when it descends it causes all the forks 151 to move radially outwardly. Cone 161 is moved by means of a threaded pin 165 which engages in a corresponding threaded hole in cone 161 and has a top piece 167 which causes it to rotate and hence adjust the position of cone 161 and hence of forks 151. A lateral pin 169 prevents cone 161 from rotating and thus ensures that the rotation of threaded pin 165 actually causes cone 161 to descend or rise.

An annular helical extension spring 171 which fits into sleeves 172 that are integral with each form 151 ensures that the individual forks will return when cone 161 is raised by the rotation of threaded pin 165. Spring 171 is pre-stressed so as to ensure contact between skirt 161A of cone 161 and pawls 163 which are integral with forks 151.

A hollow column 201, whose bottom section 201A is integral with the machine frame and along which a discoid element 203 with seals on the column itself slides, is coaxial to and underneath plate 3. Said discoid element 203 is connected to a dual piston/cylinder system 205 which controls the movement of element 203 coaxial to column 201. The cylinders of said piston/cylinder systems 205 are fixed to bottom section 201A of hollow column 201.

A flange 207, to which one edge of a flexible chamber 211 of toroidal structure is fixed by means of collar 209, is locked onto the top end of column 201. The other edge (at the bottom of the drawing) of said chamber 211 is fixed to discoid element 203 by means of a further collar 213.

Two further piston/cylinder systems 215 are also fitted underneath plate 3 and symmetrically round hollow column 201; the cylinder is integral with the machine frame whilst the end part of the rod is integral with a bracket 217 fitted to a hollow tubular element 219 which is also coaxial to hollow column 201. Hollow tubular element 219 may be raised and lowered coaxially to hollow column 201 by means of said piston/cylinder systems 215 and the top of it supports an annular section 7A of the mold inside which tire P will be vulcanized. The mode of operation of the parts mentioned above will be described below with reference to the various stages of operation of the machine.

The machine according to the invention also has a roller 120 for unloading tires after vulcanization. When it is not being used, the roller 120 occupies the position marked as 120X in FIG. 1, or is inclined to the horizontal and some distance away from the center of the machine, i.e. the mold. In order to collect the vulcanized tire and take it away from the machine the top end 122 of the roller must be above the mold as shown in FIG. 9. These movements of roller 120 are controlled by means of two arms 124 and 126 and a piston/cylinder system 128 (FIG. 1) which acts on arm 126 via hinge 128A.

The operating stages of the machine are shown in sequence in FIGS. 5 to 9. As shown in FIG. 5, the still untreated tire P is taken from feed device 75 by means of grabs 87, 89. Said grabs 87, 89 also center tire P on section 41 of the mold and set it in the correct position for the subsequent vulcanization stage. Element 43 is then raised and rotated until it occupies position 43X shown in broken lines in FIG. 1.

Figure 6:
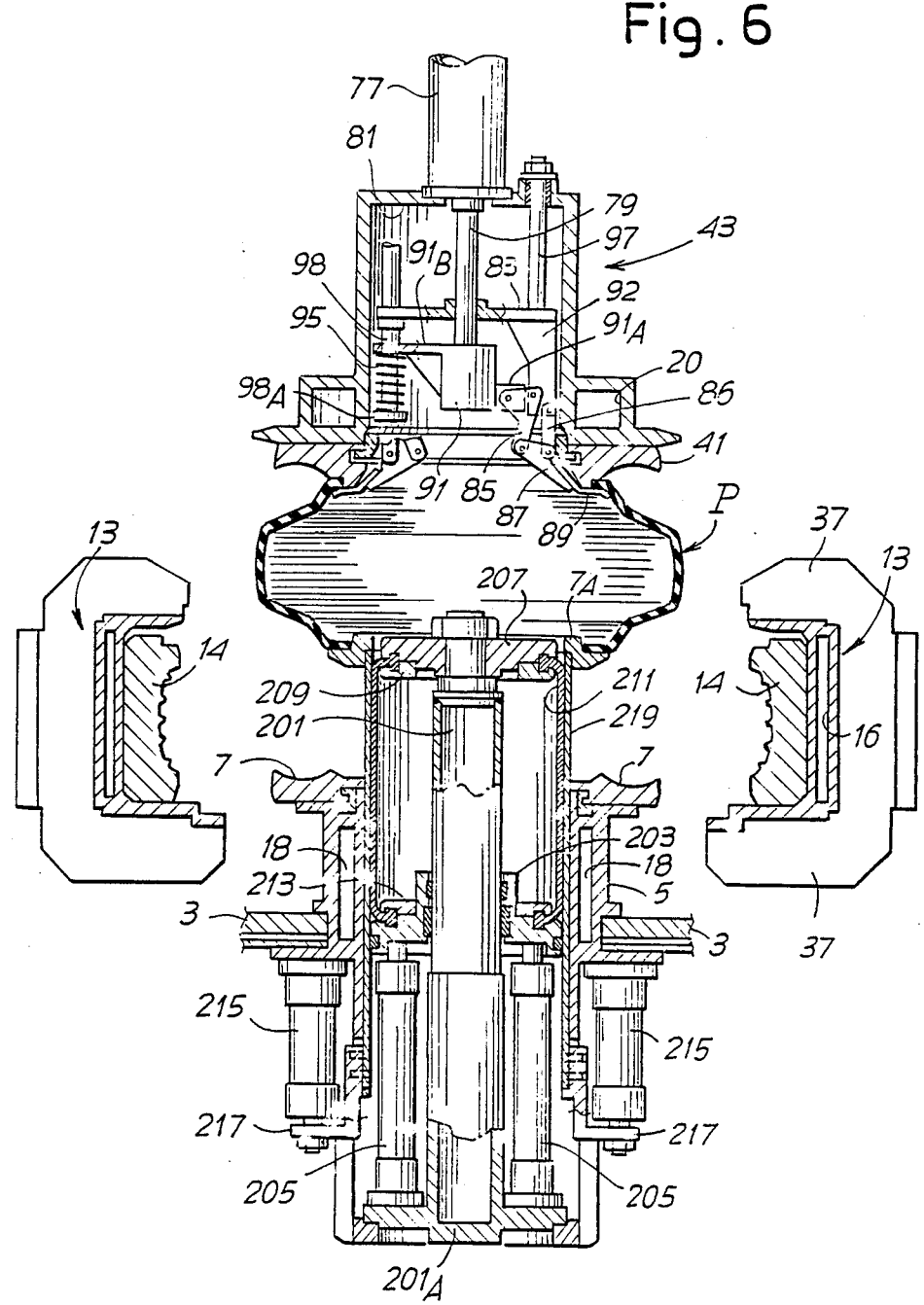

Arm 45 and element 43 are then lowered over the mold as shown in FIG. 6. Whilst element 43 is being lowered, hollow tubular element 219 is fully raised so that mold section 7A occupies a position in which it can receive the lower rim of tire P which is offered up by element 43. Piston/cylinder systems 205 and discoid element 203 are completely lowered so that flexible chamber 211 is tensioned inside hollow tubular element 219. At this stage tire P, carried by moving element 43, is correctly positioned and centered with respect to mold section 7A and hence with respect to the entire mold for the forthcoming vulcanization process.

When the lower rim of tire P has been placed on section 7A of the mold, element 43 and tubular element 219, supporting section 7A of the mold, descend simultaneously until annular mold section 7A mates with the corresponding seat cut in mold section 7, and at the same time they release flexible chamber 211 which may be taken inside tire P as a result of discoid element 203 being raised by piston/cylinder systems 205.

Figure 7:
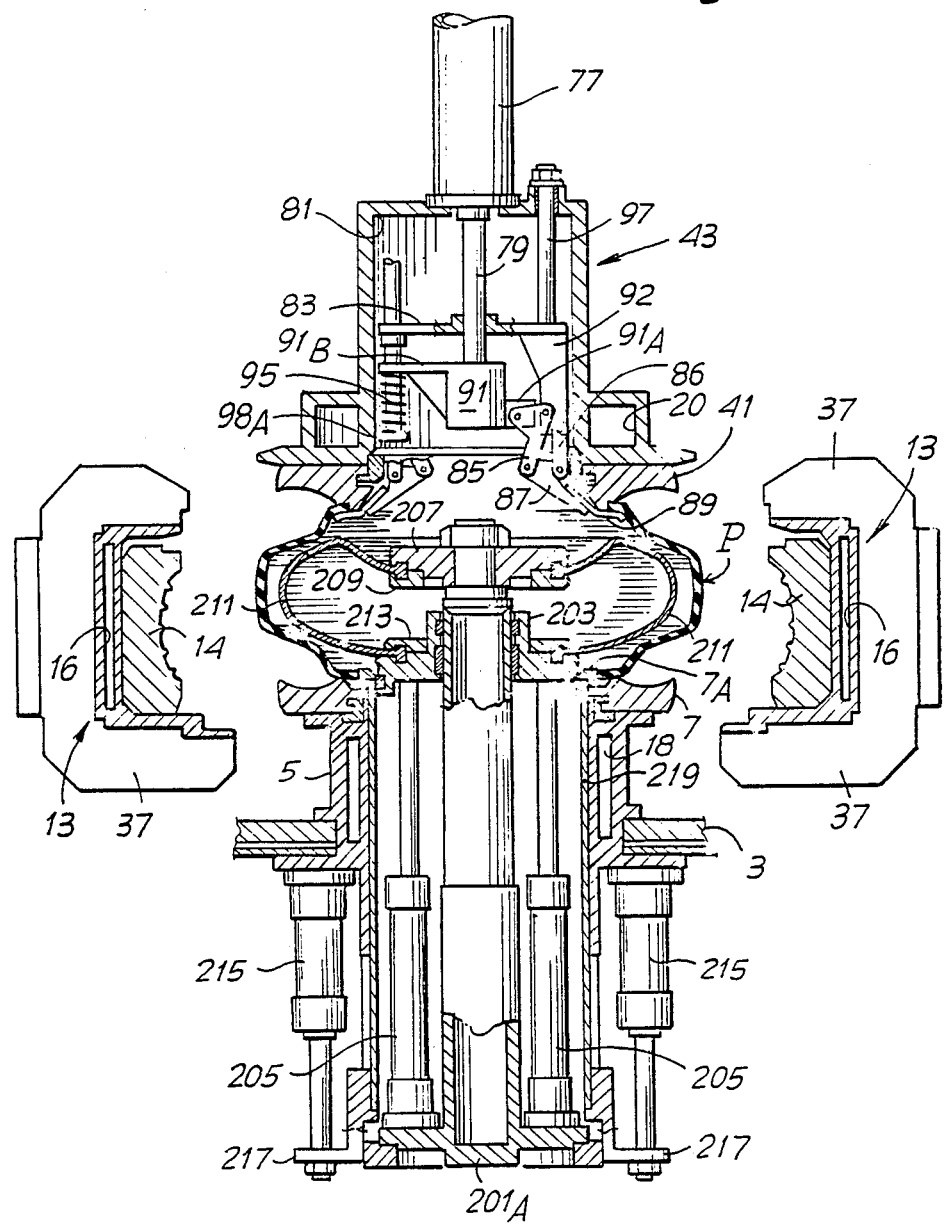

When chamber 211 is inside tire P a pressurization fluid which causes the chamber to expand is put into the latter (via nozzles on diskoid element 203). In this way tire P is kept in position by the expanded flexible chamber 211. The position that the various elements occupy at this stage is shown in FIG. 7. Grabs 87, 89 still grip the upper rim of tire P.

At this point tire P is correctly centered and positioned inside the mold, which is still open, and kept in position by flexible chamber 211. Grabs 87, 89 may be withdrawn as rod 79 is raised by means of piston/cylinder system 77. At the same time, moving element 43 is also moved downward so as to close the mold in which the tire will be vulcanized and radial sections 14. Once the mold is closed the tire can be vulcanized. FIG. 8 shows the position of the machine during this operation. In particular, segments 13 have recesses 16 for the heating medium. Further recesses 18 and 20 are provided in structure 5 and element 43 respectively. The pressure of the fluid in flexible chamber 211 is increased for the internal heating and pressurization of the tire.

When vulcanized is completed, flexible chamber 211 is depressurized and sections 14 of the mold are moved radially so that the mold itself can be opened. Element 43 is partially raised to remove the vulcanized tire from mold section 41, the said tire being held on mold section 7, 7A by chamber 211. At this point, flexible chamber 211 is withdrawn as piston/cylinder systems 205 descend and tubular element 219 is raised until it supports the upper rim of the vulcanized tire against section 41 of the mold. Grabs 87, 89 then grip the upper rim of the tire which may be completely removed from moving element 43 at this stage. In FIG. 9, element 43 is raised to unload tire P onto roller 120 which has been lowered into the horizontal position for this purpose and placed underneath the raised tire.

When the vulcanized tire has been unloaded onto roller 120, element 43 returns to its position above device 75 to grip another tire for vulcanizing. At the same time roller 120 moves into its inclined position and unloads the vulcanized tire onto suitable devices for removing it, such as a conveyor belt or similar, which are not illustrated.

Figure 11:
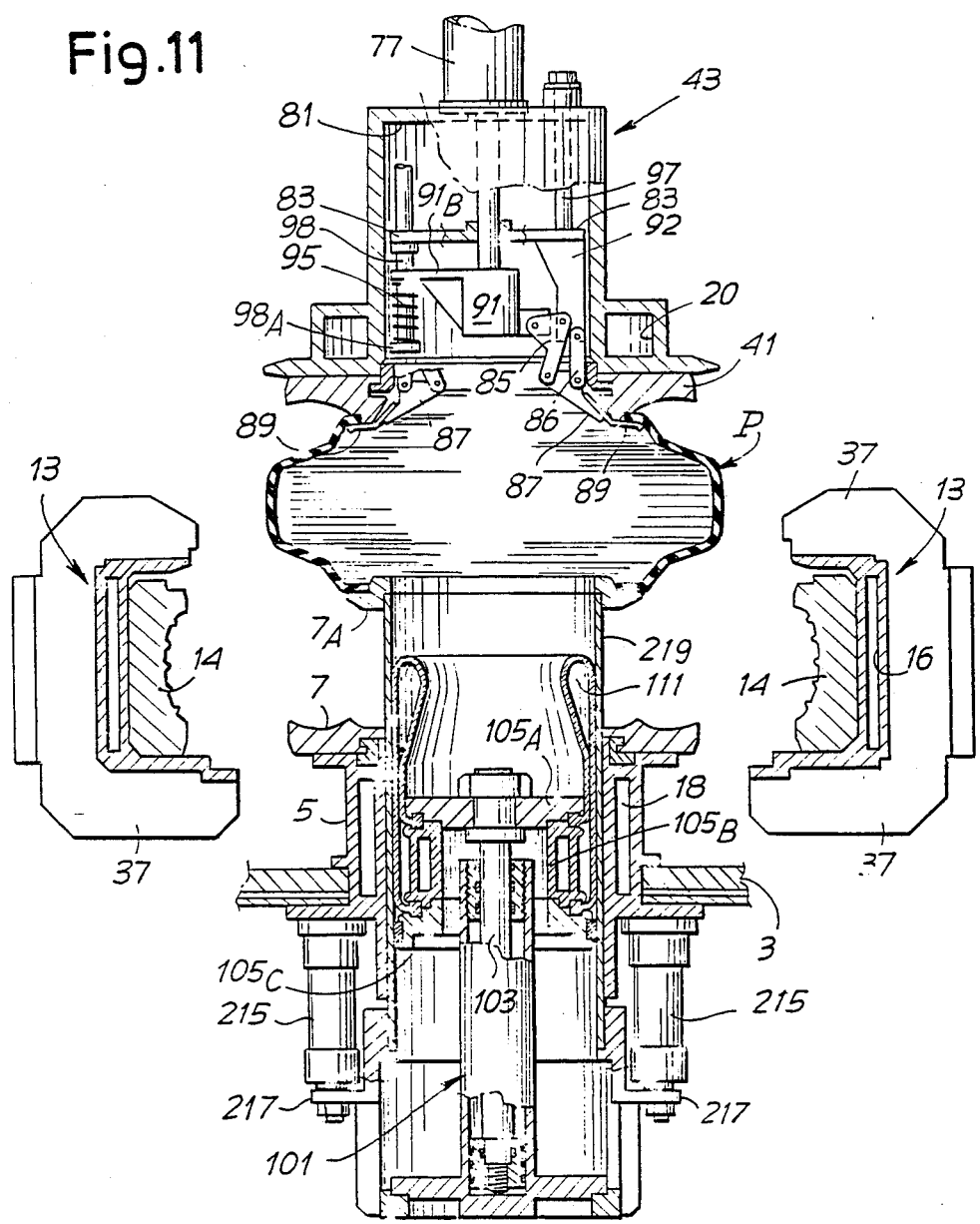
FIGS. 11 and 12 show two operating stages of the machine in a modified version of the invention.
Figure 12:
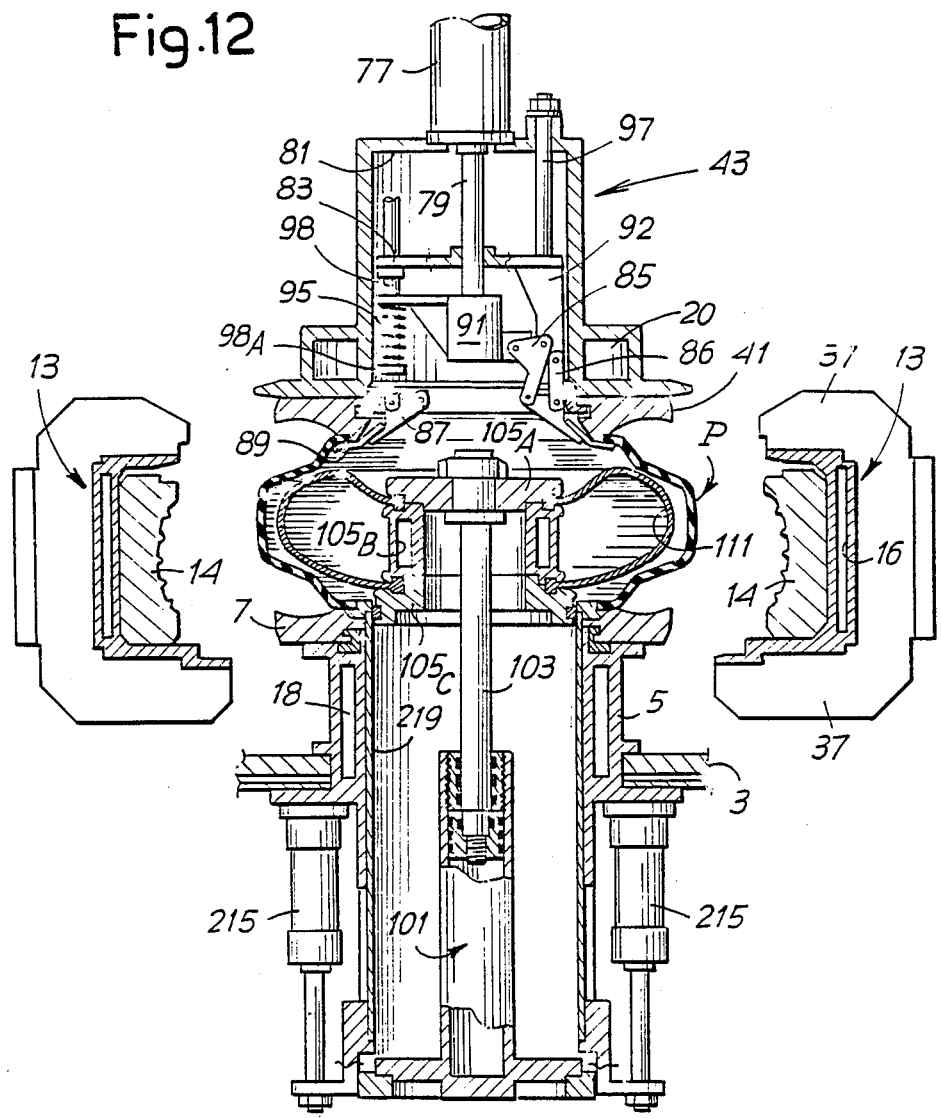

FIGS. 11 and 12 respectively show a modified version of the machine according to the invention in which the untreated tire is offered up to the mold and a vulcanized tire is unloaded. In these illustrations those parts that are shown in the preceding illustrations have the same reference numbers.

In this configuration hollow column 201 is replaced by piston/cylinder system 101; integral with its rod 103 is element 105 in three parts 105A, 105B and 105C, with which the edges of flexible chamber 111, which corresponds to flexible chamber 211 in FIGS. 6 to 9, engage. The machine in this configuration operates in the same way as already explained with reference to the preceding FIGS. 6 to 9, apart from the movement of flexible chamber 111 which is different. In FIG. 11 rod 103 and piston/cylinder system 101 are retracted and flexible chamber 111 is partly outside the open mold. In FIG. 12 rod 103 is raised and flexible chamber 111 is inside tire P which is to be vulcanized. As can be seen from FIGS. 11 and 12, in this configuration all of flexible chamber 111 is moved along the axis of the machine and not only its bottom edge as in the preceding configuration. The remaining operating stages are unchanged. The pressurized fluid is introduced into chamber 111 via recesses in element 105.

With the machine according to the invention it is possible to perform all the tire loading, vulcanization and unloading operations without the need for additional loading equipment. Automatic, semi-automatic or manual untreated tire feed and vulcanized tire removal devices may be connected to the said machine.

The machine according to the invention may easily treat tires of different sizes and tread types by replacing sections 7, 14 and 41 of the mold, as grabs 87, 89 can easily handle tires of different sizes within a sufficiently wide range and may also be replaced if required.

The machine according to the invention enables the tire to be perfectly aligned during all the processing stages. It is in fact correctly guided and positioned on the feed device 75, taken from it by means of moving element 43, which grips it with grabs 87, 89 and keeps it in position until section 7A of the mold is lowered. Guides 69 and associated rollers 67 and 71 ensure that moving element 43 is correctly positioned with respect to feed device 75 on the one hand and the mold on the other.

I claim:

1. A device for vulcanizing tires comprising: moving element means for moving a tire to be vulcanized from a collection location to a mold location and for moving a vulcanized tire from the mold location to a removal location; a top mold section connected to said moving element means; collection centering means for collecting the tires to be vulcanized and centering a rim of the tire to be vulcanized; grasping means connected to said moving element means for retaining the rim against the top mold section after the interior rim edge has been centered and for releasing the rim from the top mold section prior to vulcanizing the tire, said grasping means including oscillatable elements connected to said moving element means and connected to grasping elements for moving the grasping elements between a grasped position and a disengaged position; radially movable mold segments positioned at said mold location, said segments movable radially toward the tire to be vulcanized to be positioned about the tire to be vulcanized upon the tire to be vulcanized being moved from the collection location to the mold location; flexible chamber means positionable within the tire to be vulcanized after said radially movable mold parts are positioned about the tire to be vulcanized to maintain the tire to be vulcanized in a centered position with respect to the top mold section and the radially movable mold parts; and, piston means for moving said grasping means after said grasping element have been disengaged from the tire to be vulcanized from within the mold sections to a location above said top mold section after the flexible chamber means centers the tire to be vulcanized.

2. A device for vulcanizing tires comprising:
   moving element means for moving a tire to be vulcanized from a collection location to a mold location and for moving a vulcanized tire from the mold location to a removal location;
   a top mold section connected to said moving element means, said top mold section having a centering lip for engaging an interior edge of a tire;
   collection centering means for collecting the tire to be vulcanized and centering a rim of the tire to be vulcanized and for moving an interior rim edge of the tire to be vulcanized into engagement with the centering lip of the top mold section;
   grasping means connected to said moving element means for retaining the rim against the top mold section after the interior rim edge has been centered and has engaged with said centering lip and for releasing the rim from the top mold section prior to vulcanizing the tire, said grasping means including oscillatable elements connected to said moving element means and connected to grasping elements for moving the grasping elements between a grasped position and a disengaged position;

radially movable mold segments positioned at said mold location, said segments movable radially about the tire to be vulcanized upon the tire being moved from the collection location to the mold location;

flexible chamber means positionable within the tire to be vulcanized after said radially movable mold parts are positioned about the tire to be vulcanized to maintain the tire to be vulcanized in a centered position with respect to the top mold section and the radially movable mold parts;

piston means connected to said grasping means for removing said grasping means from adjacent the tire to be vulcanized after said grasping elements have been disengaged after the flexible chamber means centers the tire to be vulcanized.

3. A device according to claim 2, wherein said radially movable mold sections are connected to respective centering elements, each centering element including a male portion and a female portion, said male and female portions being engaged with corresponding male and female portions upon radial movement of said radially movable segments.

4. A device according to claim 1, wherein said moving element means includes a central support, an arm rotatable about said central support for movement over said collecting location, said mold location and said removing location, a moving element connected to said arm and spaced from said central support, vertical positioning means for moving said arm and said movable element in a vertical direction with respect to the central support and rotational means for rotating said arm with respect to said central support, said rotating means positioning said movable element above said collecting location, mold location and removal location.

5. A device for vulcanizing tires according to claim 4, wherein said central support is connected to said arm by guide means including a fixed guide and a roller guide.

6. A device for vulcanizing tires according to claim 2, wherein said grasping means includes a plate movable positioned within a moving element of said moving element means, a rod connected with said piston means and movable with respect to said plate; a stop element positioned on said rod for moving said plate upon movement of said rod in an upward direction, when said stop engages with said plate, said oscillatable elements being connected to each of said stop and said plate.

7. A device for vulcanizing tires according to claim 6, wherein said centering means further includes a guide rod connected to said plate and movably supported by said moving element, said guide rod being connected to a stop for limiting the movement of said guide rod and said plate in a downward direction and said plate engaging said moving element for limiting said guide rod in an upward direction and spring biasing means connected to said plate and connected to said rod stop for urging said stop in the direction of said plate.

8. A device for vulcanizing tires according to claim 2, wherein said flexible chamber means includes a flexible member connected to a flexible chamber piston element for moving said flexible element relative to the mold location and moving said flexible element relative to the radially movable mold segments.

9. A machine according to claim 8, wherein said flexible element is connected to pressurization means for pressurizing an interior of the flexible element.

10. A device according to claim 8, further comprising a bottom mold element connected to a bottom mold support, said flexible chamber piston being movably disposed surrounded by said bottom mold element.

11. A device according to claim 2, wherein said collection centering means includes a plurality of guide surfaces and means for moving said guide surfaces radially outwardly for centering and guiding the tire to be vulcanized.

12. A device for vulcanizing tires according to claim 11, wherein said guide surfaces are disposed symmetrically about a central axis of said collection centering means.

13. A device for vulcanizing tires according to claim 12, wherein said collection centering means is movable in a vertical direction by means of a cone element with a thread-receiving portion movable axially along a thread pin, said cone being connected to said collection centering means for moving said collection centering means vertically.

14. A device for vulcanizing tires according to claim 11, wherein said guide surfaces are pivotably mounted to a support and said guide surfaces include a flexible portion for engaging the tire to be vulcanized.

15. A device for vulcanizing tires according to claim 14, wherein said means for moving said guide surfaces include fork portions corresponding to each guide surface, said fork portions being engaged by a lower rim of the tire to be vulcanized and actuating said guide surfaces to engage an upper rim of the tire to be vulcanized.

16. A device for vulcanizing tires according to claim 15 wherein the position of said forks may be radially adjusted.

* * * * *